US012808577B2

(12) United States Patent
Ouabdenbi et al.

(10) Patent No.: US 12,808,577 B2
(45) Date of Patent: *Nov. 24, 2026

(54) DIVERTER PLATE FOR FURNACE OF HVAC SYSTEM

(71) Applicant: Johnson Controls Light Commercial IP GmbH, Schaffhausen (CH)

(72) Inventors: Hamid Ouabdenbi, Edmond, OK (US); William M. Harris, Norman, OK (US); Kirankumar A. Muley, Pune (IN); Sumedh J. Suryawanshi, Pune (IN)

(73) Assignee: Johnson Controls Light Commercial IP GmbH, Shaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,151

(22) Filed: Oct. 3, 2022

(65) Prior Publication Data

US 2023/0025710 A1 Jan. 26, 2023

Related U.S. Application Data

(63) Continuation of application No. 16/804,864, filed on Feb. 28, 2020, now Pat. No. 11,460,221.

(60) Provisional application No. 62/953,350, filed on Dec. 24, 2019.

(51) Int. Cl.
*F24H 3/08* (2022.01)
*F27D 17/30* (2025.01)

(52) U.S. Cl.
CPC .......... *F24H 3/087* (2013.01); *F27D 17/302* (2025.01)

(58) Field of Classification Search
None
See application file for complete search history.

(56) References Cited

U.S. PATENT DOCUMENTS

| | | | | |
|---|---|---|---|---|
| 5,029,638 | A | 7/1991 | Valenzuela | |
| 5,368,010 | A * | 11/1994 | Weber, III | F24H 9/13 126/110 R |
| 5,437,263 | A | 8/1995 | Ellingham et al. | |
| 5,582,159 | A * | 12/1996 | Harvey | F24H 8/006 73/714 |
| 6,308,702 | B1 | 10/2001 | Huyghe et al. | |
| 7,496,285 | B2 | 2/2009 | Molavi | |
| 8,056,553 | B2 * | 11/2011 | Khan | F24H 3/087 126/110 R |
| 2021/0356171 | A1 * | 11/2021 | O'Donnell | F24F 3/153 |

* cited by examiner

*Primary Examiner* — Jason Lau
(74) *Attorney, Agent, or Firm* — Jeremy Hargis

(57) ABSTRACT

A furnace for a heating, ventilation, and/or air conditioning (HVAC) system includes a heat exchanger tube including a tube inlet and a tube outlet, such that the heat exchanger tube is configured to receive combustion products via the tube inlet, circulate the combustion products through the heat exchanger tube, and discharge the combustion products via the tube outlet. Additionally, the furnace includes a collector box coupled to the heat exchanger tube and having a cavity configured to receive the combustion products via the tube outlet. The furnace includes a diverter plate disposed within the cavity, where the diverter plate overlaps the tube outlet to disperse the combustion products received via the tube outlet throughout the collector box.

17 Claims, 11 Drawing Sheets

DIVERTER PLATE FOR FURNACE OF HVAC SYSTEM

CROSS-REFERENCE TO RELATED APPLICATIONS

This is a continuation of U.S. patent application Ser. No. 16/804,864, entitled "DIVERTER PLATE FOR FURNACE OF HVAC SYSTEM," filed Feb. 28, 2020, which claims priority from and the benefit of U.S. Provisional Application No. 62/953,350, entitled "DIVERTER PLATE FOR FURNACE OF HVAC SYSTEM," filed Dec. 24, 2019, each of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and/or air conditioning (HVAC) system may be used to thermally regulate an environment, such as a building, home, or other structure. During operation, certain fluids may flow through the HVAC system, such as air, water, refrigerant, and flue gas. For example, flue gas may flow through a furnace of the HVAC system and may exchange heat with air flowing across the furnace. As the flue gas flows through the furnace, a temperature of the flue gas may change, which may cause the flue gas to condense and form condensation within the furnace. Condensation of the flue gas may reduce efficiency and/or reliability of the furnace and may accelerate planned maintenance of the furnace, such as maintenance of HVAC system components affected by the condensation of the flue gas.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a furnace for a heating, ventilation, and/or air conditioning (HVAC) system includes a heat exchanger tube including a tube inlet and a tube outlet, such that the heat exchanger tube is configured to receive combustion products via the tube inlet, circulate the combustion products through the heat exchanger tube, and discharge the combustion products via the tube outlet. Additionally, the furnace includes a collector box coupled to the heat exchanger tube and having a cavity configured to receive the combustion products via the tube outlet. The furnace includes a diverter plate disposed within the cavity, where the diverter plate overlaps the tube outlet to disperse the combustion products received via the tube outlet throughout the collector box.

In another embodiment, a furnace for a heating, ventilation, and/or air conditioning (HVAC) system includes heat exchanger tubes, where each heat exchanger tube includes a tube inlet and a tube outlet. Each heat exchanger tube is configured to receive combustion products via the tube inlet, circulate the combustion products through the heat exchanger tube, and discharge the combustion products via the tube outlet. Additionally, the furnace includes a collector box coupled to the heat exchanger tubes such that a cavity of the collector box is configured to receive the combustion products via the respective tube outlet of each heat exchanger tube and a diverter plate disposed within the cavity. The diverter plate overlaps the tube outlet of each heat exchanger tube of the plurality of heat exchanger tubes, with respect to a flow direction of combustion products through the tube outlet of each heat exchanger tube, to disperse the combustion products received via the tube outlet within the cavity.

In yet another embodiment, a furnace for a heating, ventilation, and/or air conditioning (HVAC) system includes a heat exchanger tube having a tube inlet, a tube outlet, and a tube flow path extending from the tube inlet to the tube outlet. The heat exchanger tube is configured to receive combustion products via the tube inlet, circulate the combustion products along the tube flow path, and discharge the combustion products via the tube outlet. Additionally, the furnace includes a collector box coupled to the heat exchanger tube such that a cavity of the collector box is configured to receive the combustion products via the tube outlet. The collector box has a first side configured to contact air flowing across the heat exchanger tube and a second side having the cavity. Further, the furnace includes a diverter plate disposed within the cavity. The diverter plate overlaps the tube outlet to divert a flow of the combustion products received via the tube outlet.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
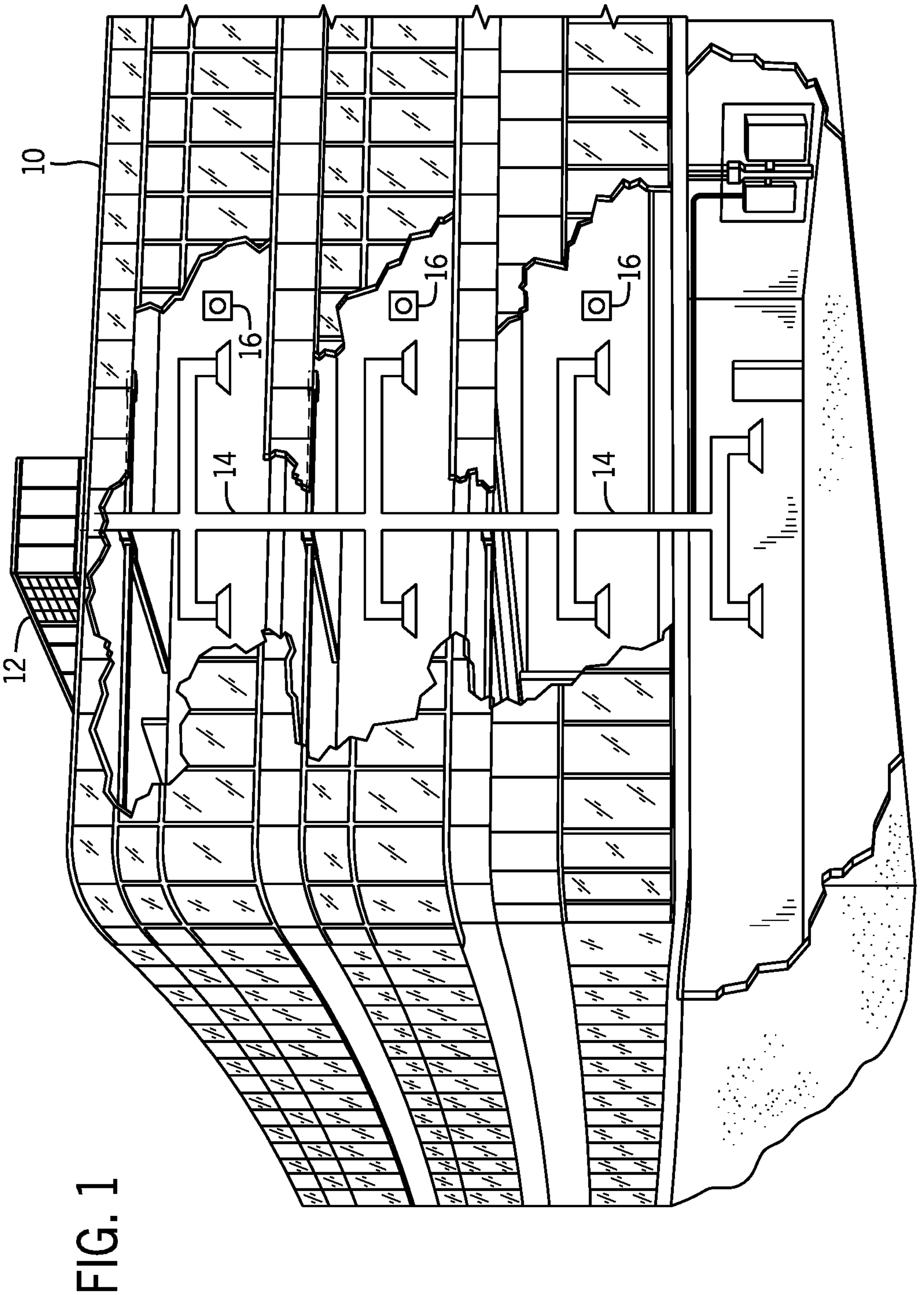
FIG. 1 is a perspective view of an embodiment of a heating, ventilation, and/or air conditioning (HVAC) system for building environmental management that may employ one or more HVAC units, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a heating, ventilation, and/or air conditioning (HVAC) system may be used to thermally regulate an environment, such as a building, home, or other structure. The HVAC system may include a furnace that circulates combustion products, such as flue gas, to exchange heat with air flowing across the furnace. For example, air may pass over heat exchanger tubes that circulate the flue gas. After passing through the heat exchanger tubes, the flue gas flows into a collector box. The air flowing across the furnace may contact a backside of the collector box, such as a side of the collector box generally opposite a side that collects the flue gas. The air may cool portions of the collector box, which may cause the flue gas to condense and form condensation within the collector box. Such condensation may reduce efficiency and/or reliability of the furnace and/or may accelerate planned maintenance of furnace, such as maintenance of the collector box and/or other components of the HVAC system affected by the condensation.

Accordingly, the present disclosure includes a furnace for an HVAC system that is configured to reduce or eliminate formation of condensation. The furnace includes a heat exchanger tube that receives combustion products, such as the flue gas, via a tube inlet, circulates the combustion products through the heat exchanger tube, and discharges the combustion products via a tube outlet. Additionally, the furnace includes a collector box coupled to the heat exchanger tube at the tube outlet. The collector box has a cavity that receives the combustion products via the tube outlet. Further, the furnace includes a diverter plate disposed within the cavity of the collector box. The diverter plate overlaps the tube outlet to disperse the combustion products received via the tube outlet throughout the collector box. As such, the diverter plate facilitates distribution of heat associated with the combustion products throughout the collector box, thereby reducing condensation of the combustion products along the collector box. Accordingly, the diverter plate described herein may reduce an amount of planned maintenance of the furnace and/or may extend a period of time between planned maintenance.

In certain embodiments, the collector box may be fluidly coupled with varying amounts of heat exchanger tubes, such as five heat exchanger tubes, seven heat exchanger tubes, or nine heat exchanger tubes. The diverter plate may disperse the combustion products received by the collector box, and therefore the heat associated with the combustion products, to portions of the collector box that are offset from the respective tube outlets of the heat exchanger tubes As described below, the diverter plate may be utilized with different embodiments of the collector box, including embodiments having different amounts of heat exchanger tubes fluidly coupled to the collector box.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other equipment, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10. In some embodiments, the HVAC unit 12 may operate in multiple zones of the building and may be coupled to multiple control devices that each control flow of air in a respective zone. For example, a first control device 16 may control the flow of air in a first zone 17 of the building, a second control device 18 may control the flow of air in a second zone 19 of the building, and a third control device 20 may control the flow of air in a third zone 21 of the building.

Figure 2:
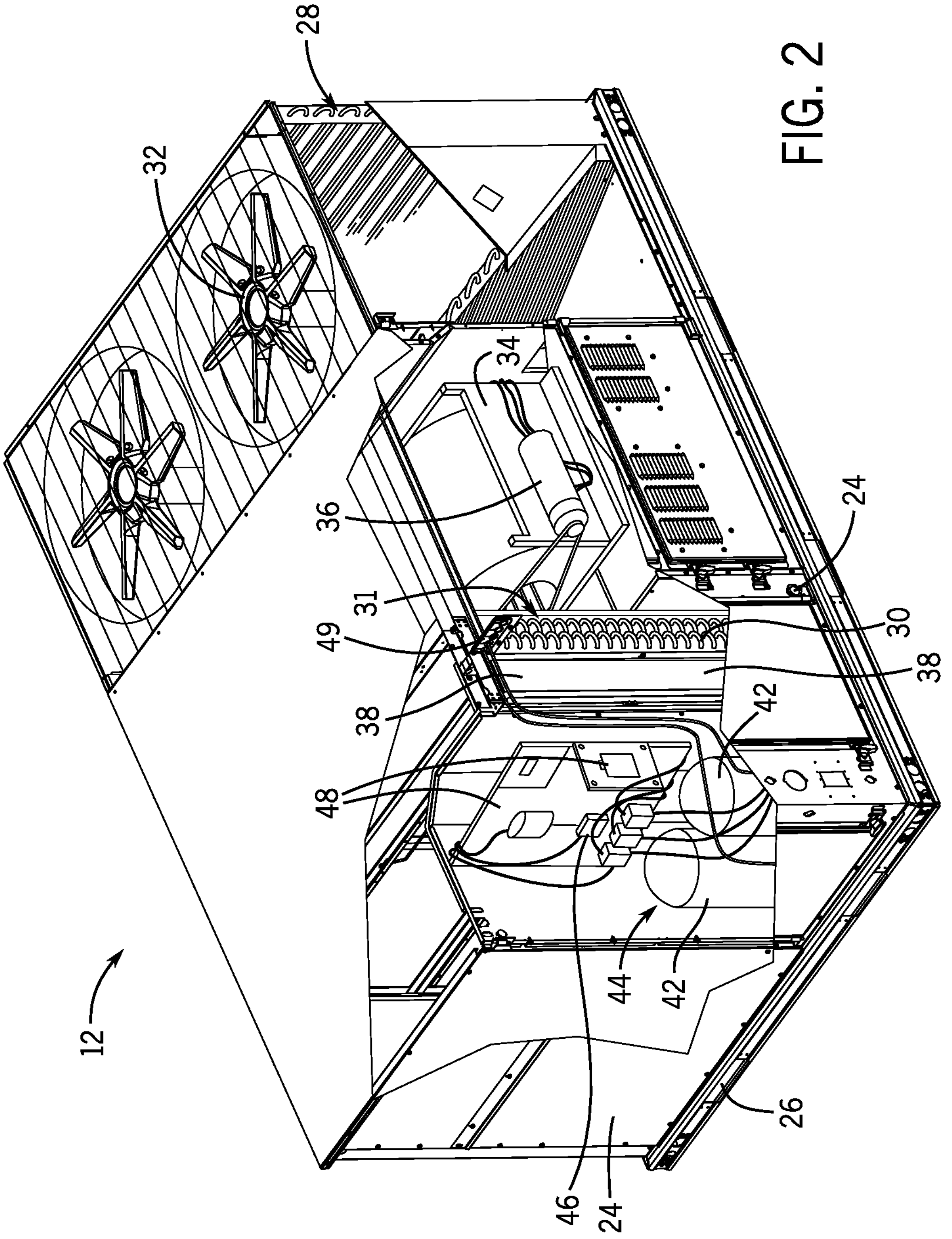
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 or enclosure encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board or controller 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
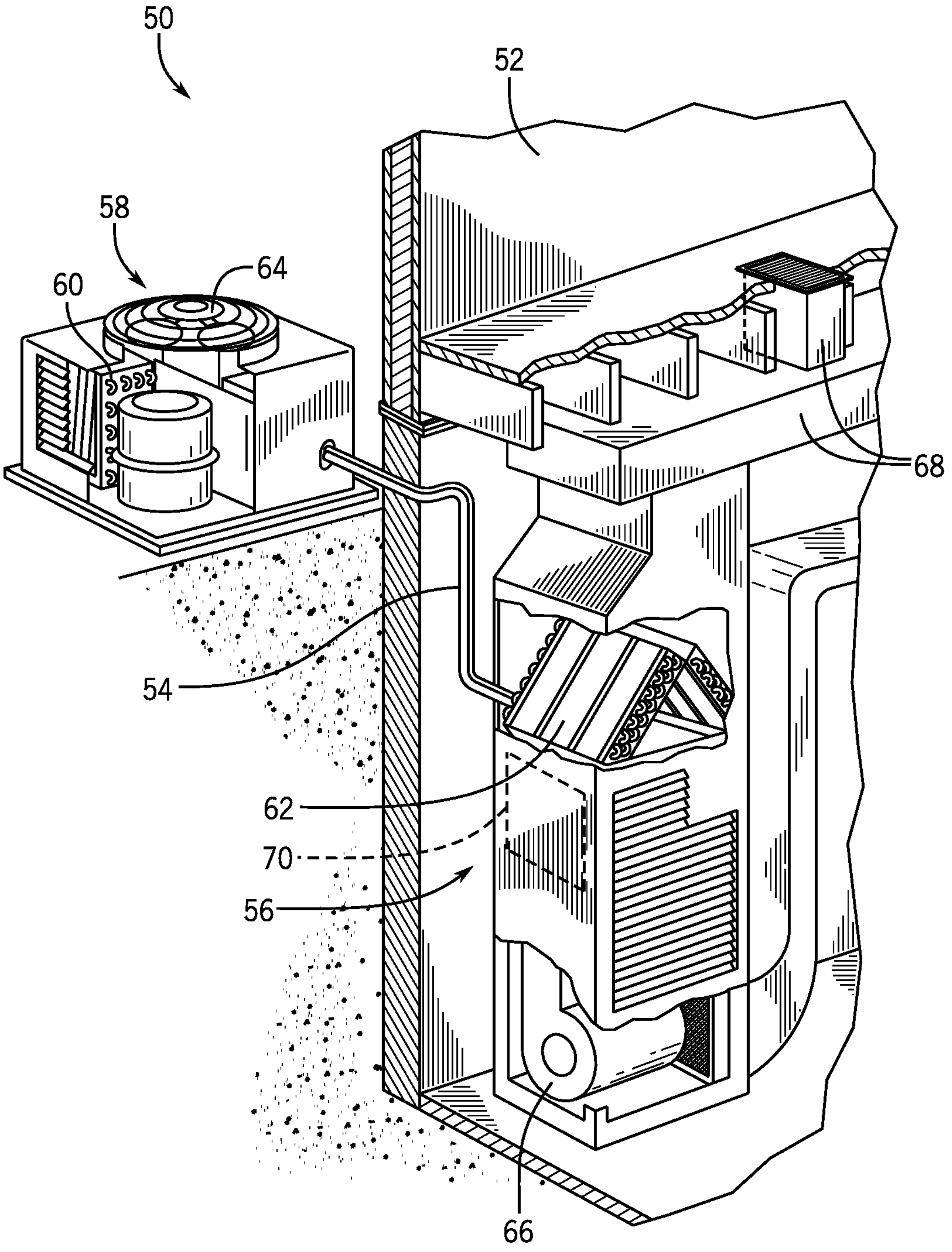
FIG. 3 is a perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
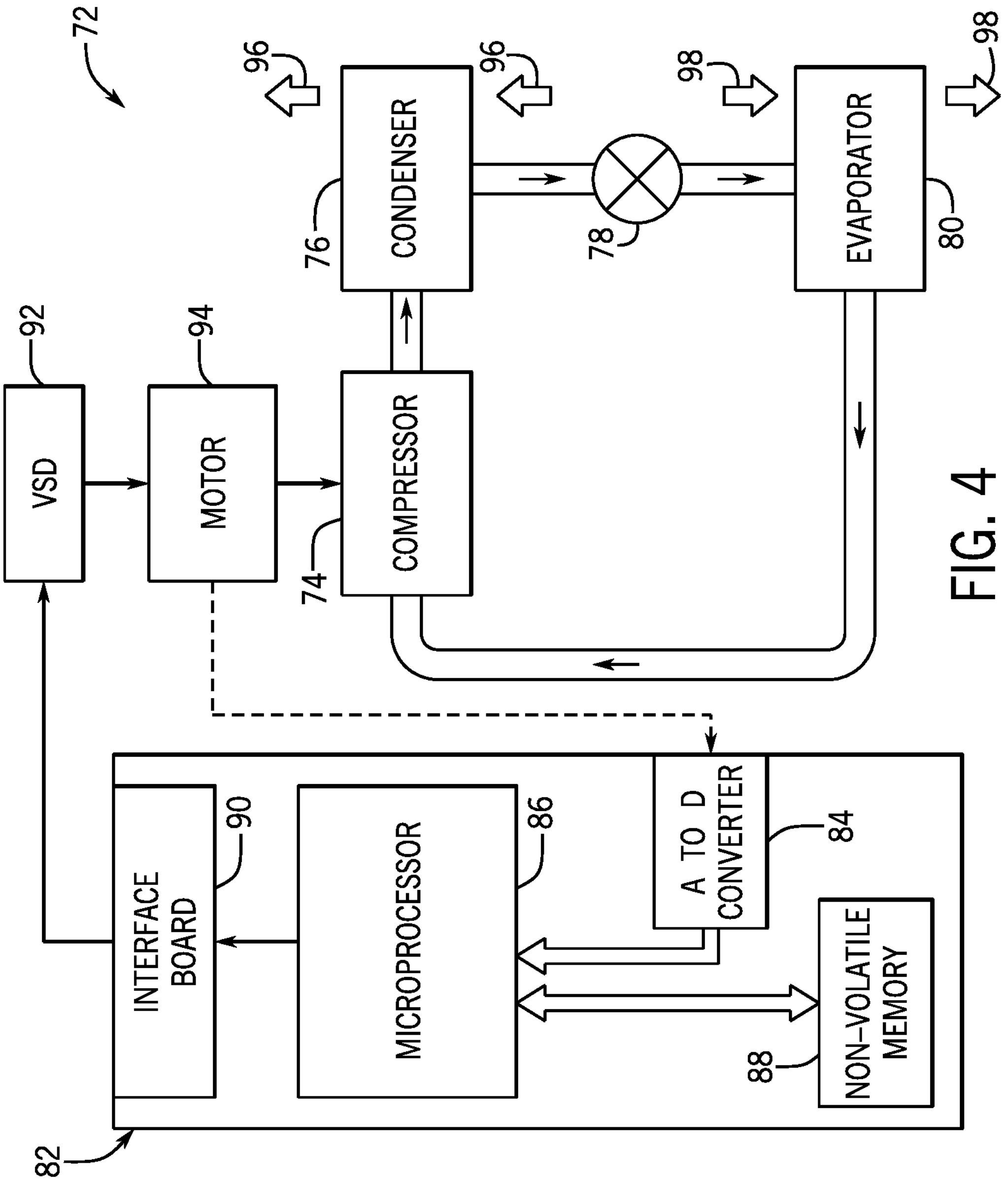
FIG. 4 is a schematic of an embodiment of a vapor compression system that may be used in an HVAC system, in accordance with an aspect of the present disclosure.

FIG. 4 is an embodiment of a vapor compression system 72 that may be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that may be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The techniques of the present disclosure may be incorporated with any or all of the features described above, as well as other systems not described above. In particular, as will be discussed in more detail below, the present disclosure provides systems for dispersing combustion products throughout a collector box of a furnace. For example, the furnace may include a diverter plate disposed in a cavity of the collector box that disperses combustion products after the combustion products exchange heat with air passing across the furnace. In the manner described below, the diverter plate of the furnace described herein may improve an efficiency and reduce maintenance of the HVAC system.

Figure 5:
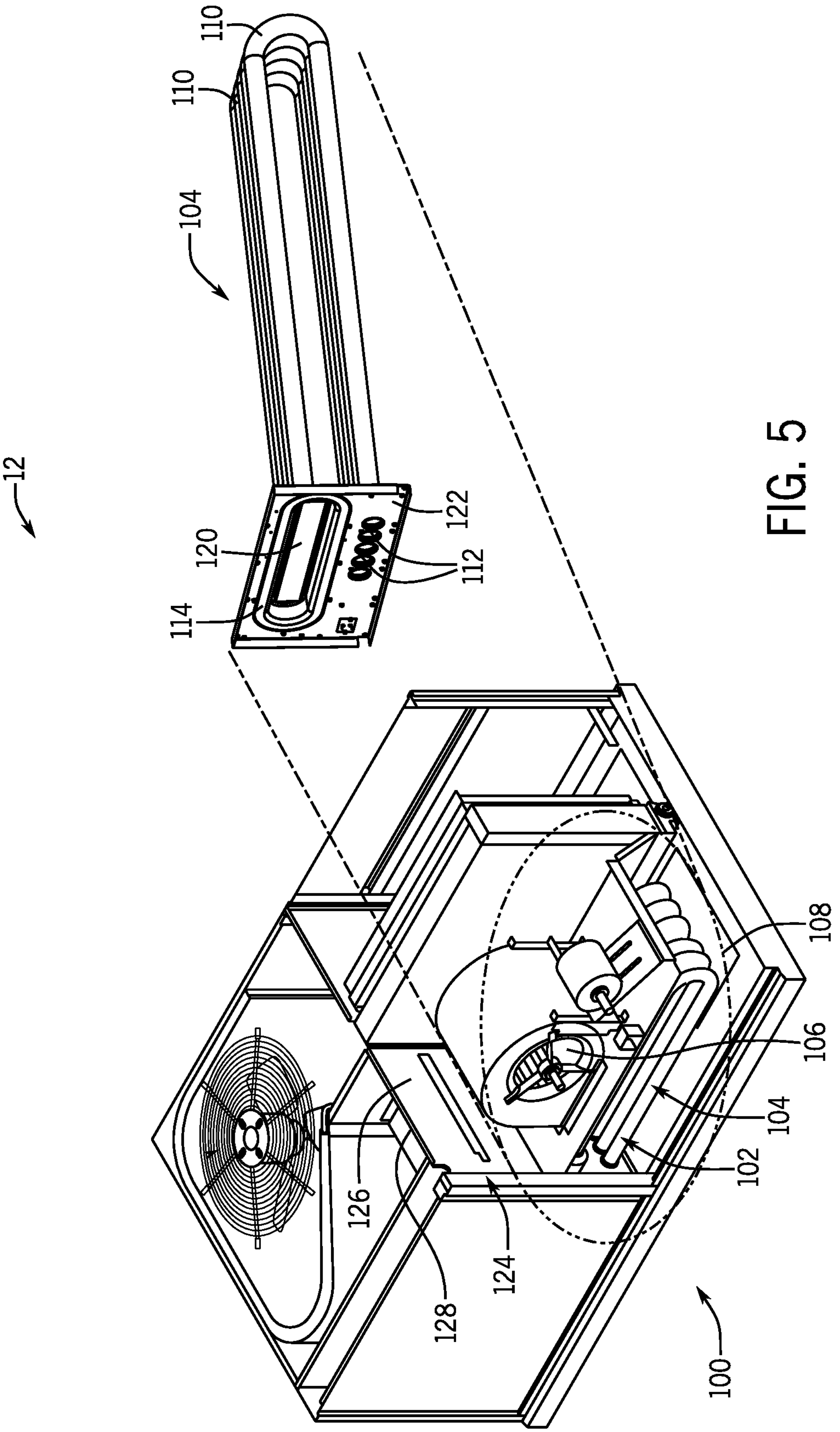
FIG. 5 is a perspective view of an embodiment of an HVAC system having a furnace, in accordance with an aspect of the present disclosure.

To help illustrate, FIG. 5 is a perspective view of an embodiment of the HVAC unit 12 having a furnace 100. The furnace 100 includes a heat exchanger 102 to heat air flowing through the HVAC unit 12. The heat exchanger 102 includes tubing 104 that circulates a heating fluid, such as combustion product(s), to heat the airflow. For example, the heat exchanger 102 may be coupled to a heat source, such as a burner assembly, via the tubing 104, such that the heat source directs the combustion products into the tubing 104. The combustion products may include a combustible flue gas generated from a fuel, such as acetylene, natural gas, propane, another gas, or any combination thereof. The combustion products then flow within the tubing 104. At the same time, the airflow conditioned by the HVAC unit 12 flows across the tubing 104. Heat is exchanged between the airflow and the heating fluid within the tubing 104, such as via conduction through the walls of the tubing 104. In this manner, heat may be transferred from the heating fluid to the airflow to increase the temperature of the airflow. The heat exchanger 102 may pose a resistance to the airflow, and the airflow may experience a pressure drop when passing over the tubing 104 of the heat exchanger 102. The HVAC unit 12 includes a blower 106 that increases the velocity of the airflow prior to flowing across the heat exchanger 102. The blower 106 directs the airflow towards an outlet 108 of the HVAC unit 12 downstream of the heat exchanger 102 to direct the airflow to ductwork, rooms, or other areas in a building, such as the building 10 in FIG. 1. As such, the airflow may provide heating for the rooms or areas of the building 10.

As illustrated, the tubing 104 includes multiple heat exchanger tubes 110 through which the combustion products may flow. For example, the combustion products may enter the heat exchanger tubes 110 at tube inlets 112 of the heat exchanger tubes 110 and may exit the heat exchanger tubes 110 at tube outlets coupled to a collector box 114 of the furnace 100. The furnace 100 includes a diverter plate 120 disposed within the collector box 114. The diverter plate 120 is configured to disperse the combustion products received by the collector box 114 from the heat exchanger tubes 110 throughout the collector box 114, thereby distributing heat transferred from the combustion products to the collector box 114. Such distribution of heat within the collector box 114 may reduce and/or prevent condensation of the combustion products within the collector box 114. For example, as supply air flows over the heat exchanger tubes 110, the supply air may flow along and cool the collector box 114, such as a backside of the collector box 114. The collector box 114 may be cooler than the combustion products received from the tube outlets of the heat exchanger tubes 110, which may cause the combustion products to cool within the collector box 114. In certain embodiments, a temperature of the combustion products may decrease below a dew point of the combustion products, thereby causing the combustion products to condense and form condensation within the collector box 114. However, the dispersion of the combustion products and the heat of the combustion products by the diverter plate 120 may substantially reduce and/or prevent condensation of the combustion products.

The tube inlets 112 and the collector box 114 are coupled to a cover plate 122 of the furnace 100. In certain embodiments, the cover plate 122 may be coupled to a panel 124 of the furnace 100. For example, the cover plate 122 may be coupled to a first side 126 of the panel 124. The furnace 100 may include a blower, such as a draft inducer blower, coupled to a second side 128 of the panel 124, such as a side generally opposite the first side 126. The blower may be configured to draw the combustion products through the heat exchanger tubes 110, out of the tube outlets of the heat exchanger tubes 110, through the collector box 114, and into and/or through the blower. The blower may then discharge the combustion products via an exhaust port. The diverter plate 120 may be disposed generally between the tube outlets of the heat exchanger tubes 110 and the blower, such that the blower draws the combustion products around/through the diverter plate 120, thereby causing the diverter plate 120 to disperse the combustion products throughout the collector box 114. In some embodiments, the tubes inlets 112 and/or the collector box 114 may be coupled to the panel 124, such that the cover plate 122 is omitted from the furnace 100.

Figure 6:
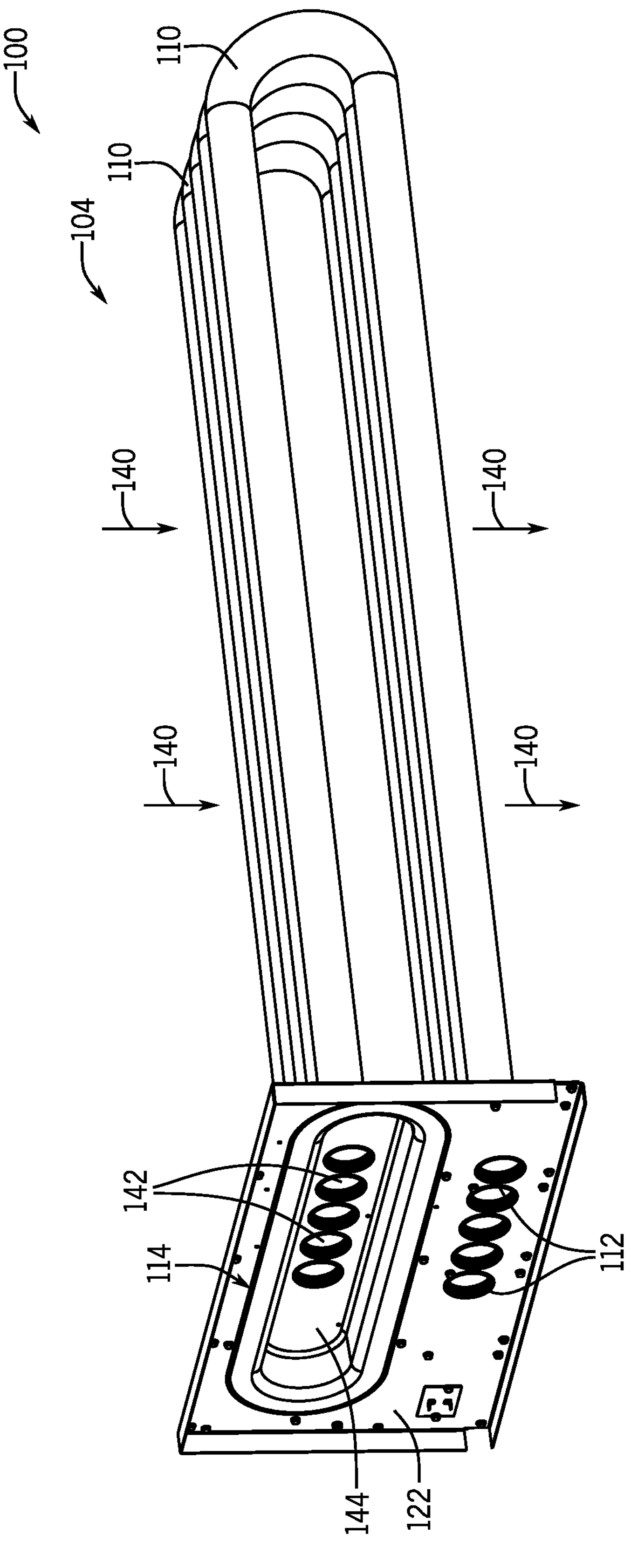
FIG. 6 is a perspective view of an embodiment of heat exchanger tubes and a collector box of an HVAC system, in accordance with an aspect of the present disclosure.

FIG. 6 is a perspective view of an embodiment of the heat exchanger tubes 110 and the collector box 114 of the furnace 100. For clarity purposes, the diverter plate 120 is omitted in FIG. 6. As described above, an air flow 140 may pass over the heat exchanger tubes 110 and may exchange heat with the heat exchanger tubes 110. For example, heat may transfer from the combustion products circulating through the heat exchanger tubes 110 to the air flow 140 via the heat exchanger tubes 110. As illustrated, the air flow 140 is directed generally downwardly. In certain embodiments, the air flow 140 may be directed upwardly and/or laterally across the heat exchanger tubes 110. The air flow 140 may cool the collector box 114, such as a rear side of the collector box 114 that is not visible in FIG. 6. As the combustion products flow through tube outlets 142 of the heat exchanger tubes 110, the combustion products flow into and/or through a cavity 144 of the collector box 114.

Figure 7:
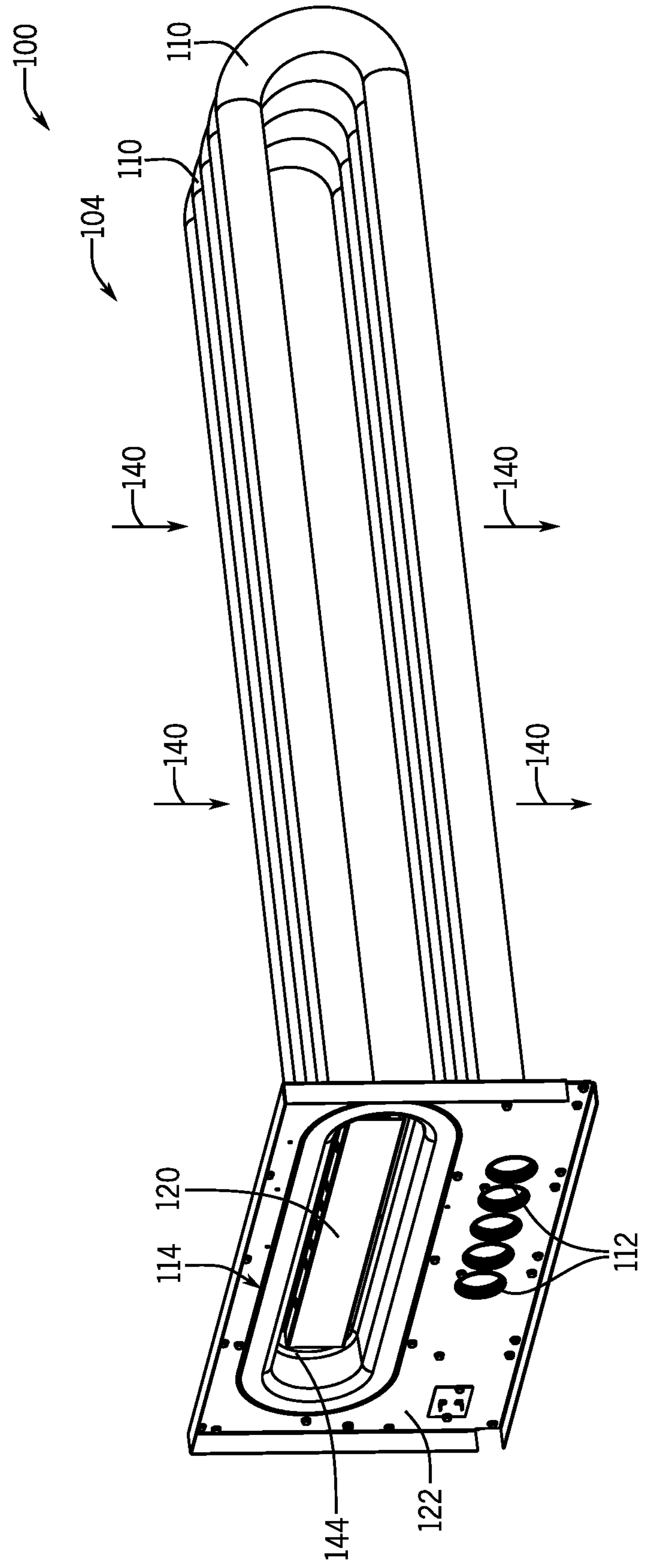
FIG. 7 is a perspective view of an embodiment of heat exchanger tubes and a collector box having a diverter plate of an HVAC system, in accordance with an aspect of the present disclosure.

With the foregoing in mind, FIG. 7 is a perspective view of an embodiment of the diverter plate 120 coupled to the collector box 114. As illustrated, the diverter plate 120 is disposed within the cavity 144 of the collector box 114. The combustion products may exchange heat with the collector box 114 in the cavity 144, which may decrease the temperature of the combustion products. In other words, as the combustion products flow within the collector box 114 and contact the surfaces of the collector box 114, the temperature of the combustion products may be lowered. For example, as the air flow 140 flows across the heat exchanger tubes 110 of the furnace 100, a portion of the air flow 140 may contact a rear side of the collector box 114 facing the heat exchanger tubes 110, which may lower the temperature of surface of the collector box 114. Thus, when the combustion products flow within the cavity 144 of the collector box 114, heat may transfer from the combustion products to the surfaces of the collector box 114, thereby lowering the temperature of the combustion products. The diverter plate 120 may disperse the combustion products within the cavity 144, thereby dispersing the heat associated with the combustion products throughout the collector box 114. By dispersing the heat, formation of cold spots or areas within the collector box 114 and along the surfaces of the collector box 114 may be reduced, and heat transfer between the combustion products and the collector box 114 may be more uniform. In this way, the diverter plate 120 may reduce and/or prevent condensation of the combustion products within the cavity 144.

As illustrated, the diverter plate 120 overlaps the entire tube outlet of each heat exchanger tube 110 relative to a direction of flow of the combustions products through each heat exchanger tube 110 and from each tube outlet, such that the tube outlets are not visible in FIG. 7. In certain embodiments, the diverter plate 120 may overlap only a portion of one or more tube outlets. For example, the diverter plate 120 may only overlap 10%, 20%, 25%, 30%, 40%, 50%, 60%, 70%, 75%, 80%, 90%, 95%, 97%, or 99% of one or more of the tube outlets relative to the direction of flow of the combustions products through each heat exchanger tube 110 and from each tube outlet. In some embodiments, the diverter plate 120 may overlap one or more tube outlets more than other tube outlets. For example, the diverter plate 120 may overlap 100% of one or more tube outlets while only overlapping a portion of one or more other tube outlets. The diverter plate 120 not overlapping a tube outlet and/or a portion of the tube outlet may be due to the diverter plate 120 not extending laterally over the entire portion of the tube outlet. Additionally or alternatively, the diverter plate 120 not overlapping a tube outlet and/or a portion of the tube outlet may be due to the diverter plate 120 including holes that allow the combustion products to flow from the tube outlet and through the holes of the diverter plate 120. As described in greater detail below in reference to FIG. 10, a deflecting surface 220 of the diverter plate 120 may include holes that allow the combustion products to flow through the diverter plate 120.

Figure 8:
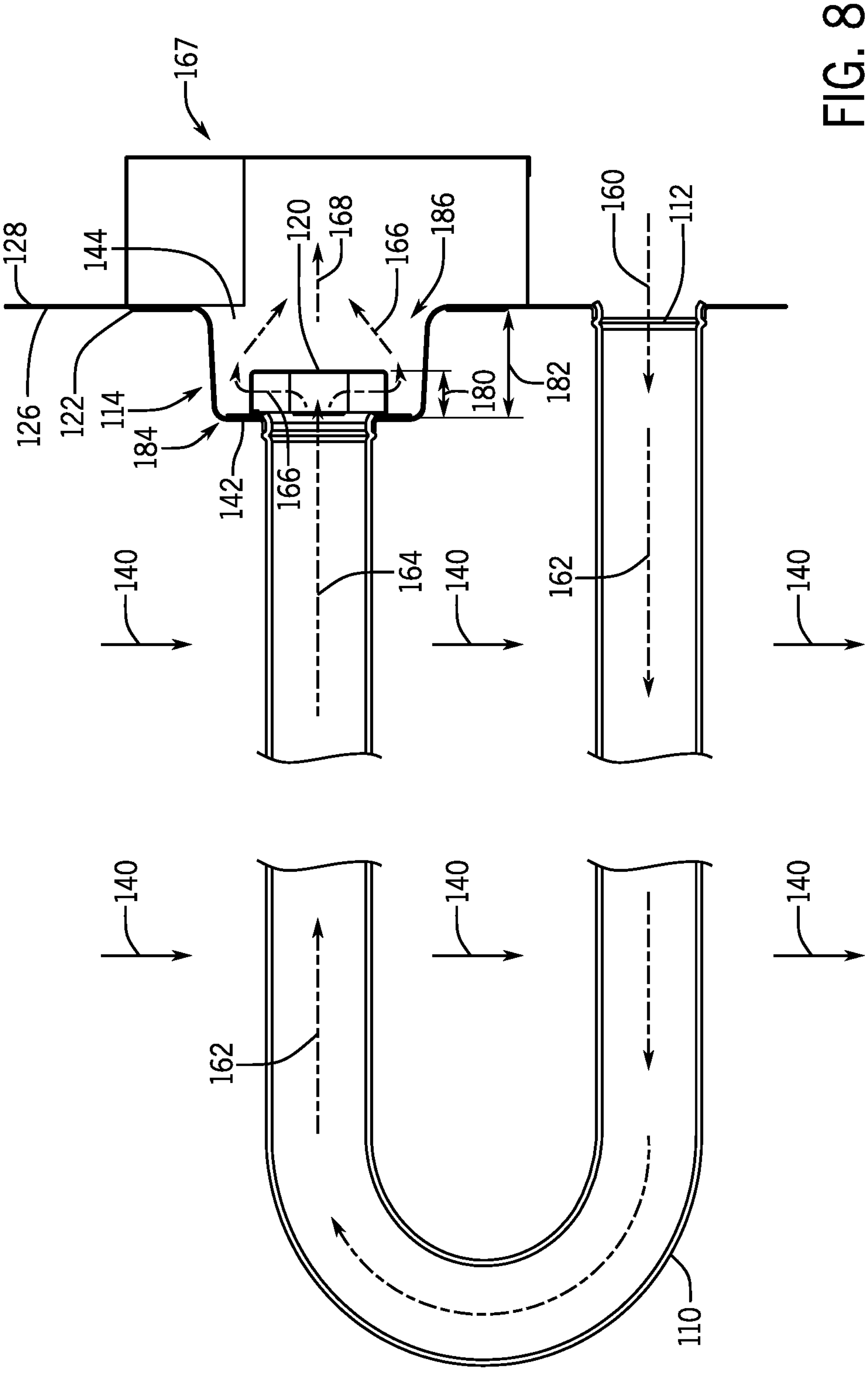
FIG. 8 is a schematic view of an embodiment of heat exchanger tubes and a collector box having a diverter plate of an HVAC system, in accordance with an aspect of the present disclosure.

FIG. 8 is a cross-sectional schematic view of an embodiment of one of the heat exchanger tubes 110 coupled to the collector box 114 and the diverter plate 120 disposed within the collector box 114. Combustion products may enter the heat exchanger tube 110 via the tube inlet 112, as indicated by arrow 160. The combustion products may flow/circulate along a tube flow path 162, which may be defined by a tube axis, of the heat exchanger tube 110, such as generally from the tube inlet 112 toward the tube outlet 142. The tube flow path 162 or axis may extend generally along a centerline of the heat exchanger tube 110 and may extend radially outwardly from the centerline. The combustion products may exit the heat exchanger tube 110, flow through the tube outlet 142, as indicated by arrow 164, and enter the cavity 144 of the collector box 114. The combustion products may be diverted by the diverter plate 120 to flow throughout the collector box 114, such as diverted vertically, as indicated by arrows 166, and/or laterally. For example, the diverter plate 120 may overlap with the tube outlet 142, and thus may overlap with or intersect the tube flow path 162 or axis. For example, if the diverter plate 120 is viewed from a side of the diverter plate 120 opposite the tube outlet 142, the diverter plate 120 would overlap the tube outlet 142 relative to the flow path 162, such that the tube outlet 142 would not be visible. Thus, as the combustion products flow into the cavity 144 from the tube outlet 142, the combustion products may contact the diverter plate 120, such that the diverter plate 120 directs the combustion products in multiple directions throughout the cavity 144, which enables increased contact between the combustion products and the various surfaces of the collector box 114 that define the cavity 144. Thereafter, the combustion products may exit the collector box 114 and flow toward a blower 167 of the furnace 100, such as a draft inducer blower, as indicated by arrow 168. The blower 167 may be coupled to the second side 128 of the panel 124, such as generally opposite the collector box 114 and the cover plate 122 coupled to the first side 126 of the panel 124. The blower 167 may be configured to draw the combustion products through the heat exchanger tube 110, into and through the cavity 144, and/or into and through the blower 167.

As described above in reference to FIG. 7, the diverter plate 120 may overlap only a portion of the tube outlet 142, such that the diverter plate 120 diverts and/or disperses only a portion of the combustion products exiting the tube outlet 142 along the flow path 164. As such, the diverter plate 120 may overlap the entire tube outlet 142 or only a portion of the tube outlet 142 relative to the flow path 164 of one or more heat exchanger tubes 110. By overlapping the tube outlet 142, the diverter plate 120 may divert the combustion products and/or alter the flow path 164 of the combustion products from the tube outlet 142.

In certain embodiments, the diverter plate 120 may be coupled to the cover plate 122, such as in place of or in addition to being coupled to the collector box 114. While coupled to the cover plate 122, the diverter plate 120 may disperse the combustion products throughout the collector box 114. In some embodiments, the diverter plate 120 may extend into the cavity 144 while coupled to the cover plate 122, thereby facilitating dispersion of the combustion products throughout the collector box 114.

The diverter plate 120 has a depth 180, such as a distance that the diverter plate 120 extends from the tube outlet 142 and/or an outermost portion of the diverter plate 120 relative to the tube outlet 142. For example, the depth 180 may be a gap between an outermost edge of the tube outlet 142 and a deflecting surface of the diverter plate 120. The cavity 144 of the collector box 114 has a depth 182, such as a distance that the cavity 144 extends from the tube outlet 142 and/or an outermost portion of the cavity 144 relative to the tube outlet 142. As illustrated, the depth 180 of the diverter plate 120 is less than the depth 182 of the cavity 144, such that the diverter plate 120 is disposed within the cavity 144. For example, the depth 180 may be about 75 percent of the depth 182, 50 percent of the depth 182, 33 percent of the depth 182, 25 percent of the depth 182, or any other suitable depth. In some embodiments, the depth 180 may be generally equal to the depth 182.

As the air flow 140 contacts a first side 184 of the collector box 114, such as a rear side of the collector box 114, the air flow 140 may cool the collector box 114. A second side 186 of the collector box 114, such as a side of the collector box 114 facing the cavity 144 and/or a side generally opposite the first side 184, may be heated by combustion products in the cavity 144. Thus, when the combustion products flow within the cavity 144 of the collector box 114, heat may transfer from the combustion products to the second side 186 of the collector box 114, thereby lowering the temperature of the combustion products. The diverter plate 120 may disperse the combustion products within the cavity 144, thereby dispersing the heat associated with the combustion products throughout the collector box 114, such along over the second side 186. By dispersing the heat, formation of cold spots or areas within the collector box 114 and along the second side 186 may be reduced, and heat transfer between the combustion products and the collector box 114 may be more uniform. Accordingly, the diverter plate 120 may disperse the combustion products throughout the collector box 114, thereby distributing heat associated with the combustion products and reducing/preventing condensation of the combustion products.

Figure 9:
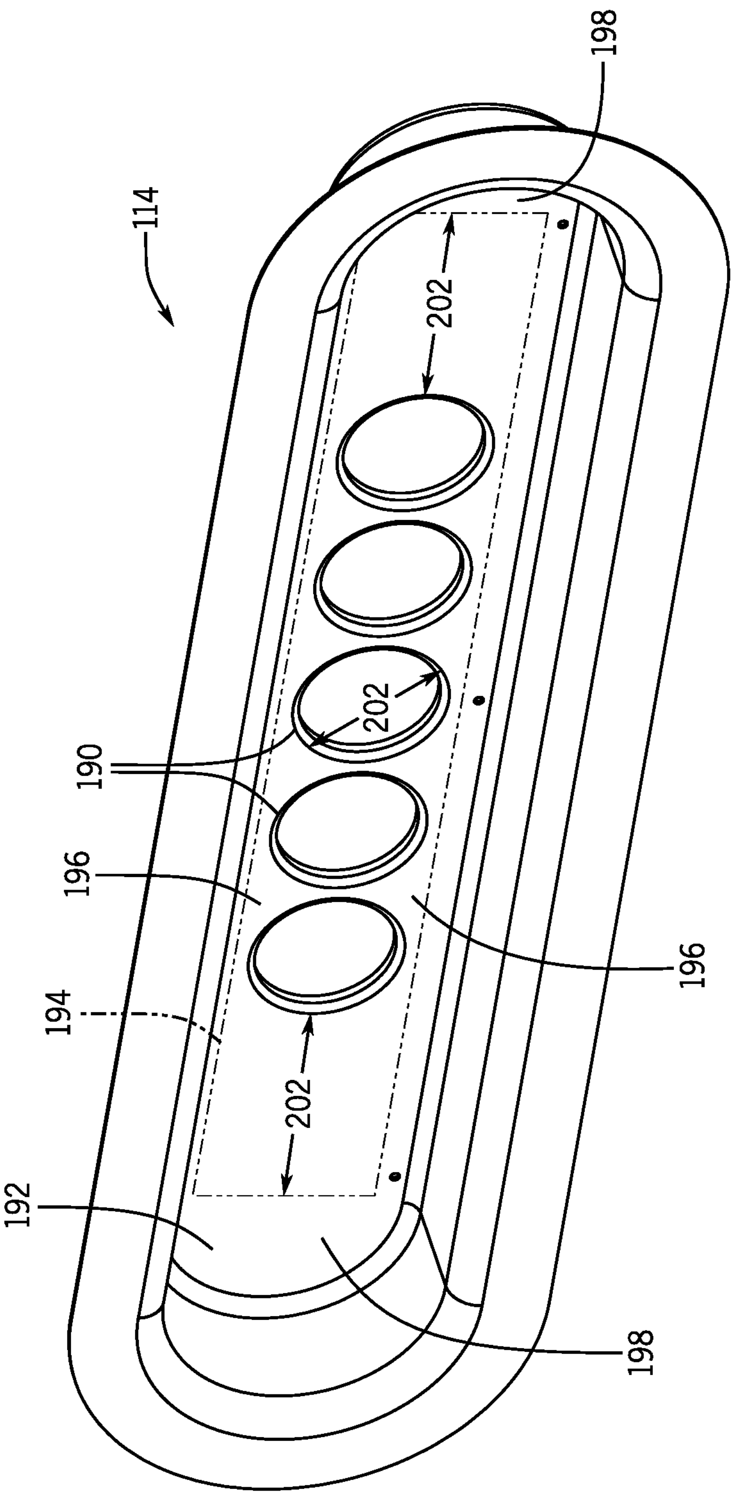
FIG. 9 is a perspective view of an embodiment of a collector box of an HVAC system, in accordance with an aspect of the present disclosure.

FIG. 9 is a perspective view of an embodiment of the collector box 114 including apertures 190 configured to interface and/or fluidly couple to the tube outlets 142 of the heat exchanger tubes 110. The diverter plate 120 is configured to couple to a mounting surface 192 of the collector box 114, as indicated by line 194, such that the diverter plate 120 overlaps the apertures 190 formed in the mounting surface 192 and intersects the tube flow path 162 of each heat exchanger tube 110 along the respective tube axes. The mounting surface 192 includes vertical portions 196 extending generally vertically from the apertures 190 in an installed configuration of the collector box 114 and lateral portions 198 extending generally laterally from the apertures 190. The diverter plate 120 may mount to one or both vertical portions 196 and/or one or both lateral portions 198. As the combustion products are discharged through the tube outlets 142 and through the apertures 190, the combustion products may contact the diverter plate 120, and the diverter plate 120 may disperse the combustion products along the vertical portions 196 and/or along the lateral portions 198 of the mounting surface 192.

As illustrated, the mounting surface 192 has five apertures 190 disposed between the lateral portions 198 of the collector box 114. In certain embodiments, the collector box 114 may include additional apertures 190 along the lateral portions 198, such as seven apertures 190, nine apertures 190, or another suitable number of apertures 190, where each aperture 190 is fluidly coupled to one of the heat exchanger tubes 110. Accordingly, the collector box 114 may be used for different embodiments of the furnace 100 having varying amounts of heat exchanger tubes 110.

Each aperture 190 has a diameter 200, which may correspond and/or be approximately equal to a diameter of the tube outlets 142 of the heat exchanger tubes 110. Further, the diverter plate 120 extends a dimension 202 from each outermost aperture 190. The dimension 202 may be proportional to the diameter 200, such that the dimension 202 is sufficient to properly divert and/or disperse the combustion products throughout the collector box 114. In other words, the diverter plate 120 may be sized to have the dimension 202, such that the diverter plate 120 directs the combustion products along the various surfaces of the collector box 114, including the vertical portions 196 and lateral portions 198 of the collector box 114. For example, the dimension 202 may be approximately 50 percent of the diameter 200, equal to the diameter 200, 200 percent of the diameter 200, or another suitable proportion of the diameter 200.

Figure 10:
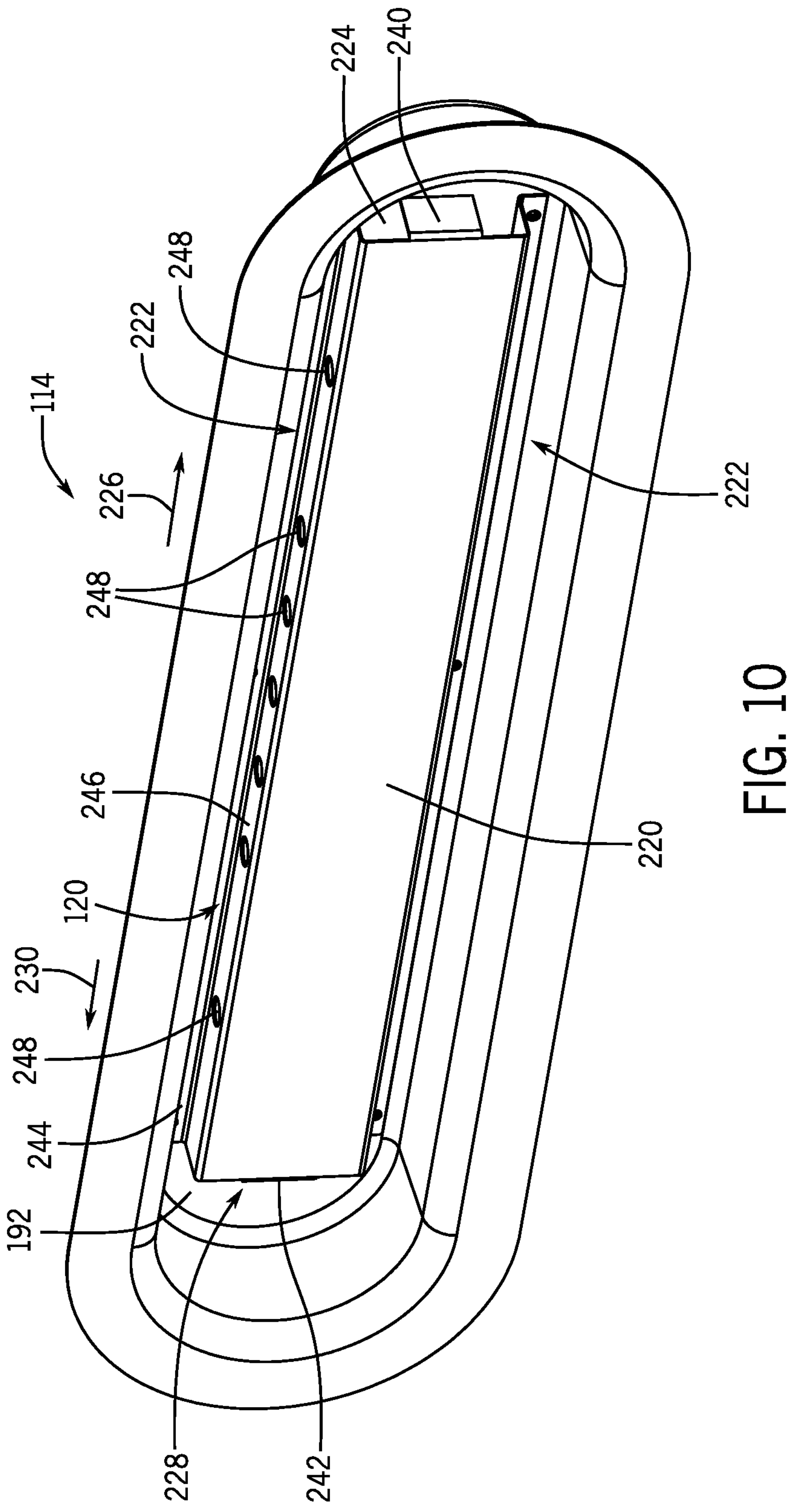
FIG. 10 is a perspective view of an embodiment of a collector box having a diverter plate of an HVAC system, in accordance with an aspect of the present disclosure.

FIG. 10 is a perspective view of an embodiment of the diverter plate 120 disposed within and coupled to the collector box 114. The diverter plate 120 includes a deflecting surface 220 and flanges 222 extending from the deflecting surface 220 and which are coupled to the mounting surface 192 of the collector box 114. The deflecting surface 220 may deflect combustion products received into the cavity 144 from the heat exchanger tubes 110. For example, the deflecting surface 220 may intersect and/or overlap with the tube flow path 162 of each heat exchanger tube 110 and/or may extend generally crosswise to the tube flow paths 162 of the heat exchanger tubes 110 at the tube outlets 142. In this way, the diverter plate 120 is configured to divert the combustion products exiting the tube outlets 142 to flow throughout the cavity 144 of the collector box 114 and along the various surfaces of the collector box 114. The deflecting surface 220 and the flanges 222 may form side passages between the diverter plate 120 and the collector box 114. For example, a first side passage 224 extends between the mounting surface 192, the deflecting surface 220, and the flanges 222 to form a flow path in a first direction 226, such that the combustion products may be directed to flow from the tube outlets 142 and through the first side passage 224 in the first direction 226. A second side passage 228 extends between the mounting surface 192, the deflecting surface 220, and the flanges 222 to form a flow path in a second direction 230, such that the combustion products may be directed to flow from the tube outlets 142 and through the second side passage 228 in the second direction 230.

In the illustrated embodiment, the diverter plate 120 further includes a first side flange 240 extending into the first side passage 224 and a second side flange 242 extending into the second side passage 228. The side flanges 240 and 242 are configured to facilitate further dispersion the combustion products by the diverter plate 120. For example, the side flanges 240 and 242 may block at least a portion of the combustion products flowing through the side passages 224 and 228 toward the side flanges 240 and 242, respectively, from exiting the side passages 224 and 228, thereby facilitating dispersion of the combustion products and heat associated with the combustion products throughout the collector box 114.

Each flange 222 of the diverter plate 120 includes a mounting portion 244 coupled to the mounting surface 192 and a mounting extension 246 coupled to the deflecting surface 220 of the diverter plate 120. Each mounting extension 246 of the illustrated embodiment includes holes 248 configured to facilitate dispersion of the combustion products throughout the collector box 114. For example, the combustion products may flow through the holes 248, such as after contacting the deflecting surface 220. As illustrated, seven holes 248 are arrayed laterally along the mounting extension 246. In certain embodiments, the mounting extension 246 may include more or fewer holes 248 to facilitate dispersion of the combustion products throughout the collector box 114, such as one hole 248, two holes 248, four holes 248, ten holes 248, etc. The holes 248 may be formed in the mounting extension 246 in any desirable spacing, pattern, or arrangement. For example, the holes 248 may be positioned along the mounting extension 246 based on a computational fluid dynamics (CFD) analysis, based on a calculated or expected temperature profile of the collector box, or other suitable parameters. In certain embodiments, the deflecting surface 220 may also include holes configured to direct the combustion products therethrough. As illustrated, the holes 248 are circular/round. In certain embodiments, some or all of the holes 248 may include other shapes, such as squares, rectangles, slots, irregular and/or random openings, and other suitable shapes. In certain embodiments, the deflecting surface 220 may include hole(s) configured to flow the combustion products from the tube outlets 142 and through the diverter plate 120. The holes in the deflecting surface 220 may generally align with some or all of the tube outlets 142, portion(s) of the tube outlets 142, and/or may be offset from the tube outlets 142 relative to the flow paths 162 and/or 164.

As illustrated, the deflecting surface 220 of the diverter plate 120 is generally planar and extends generally parallel to the mounting surface 192 of the collector box 114. In certain embodiments, the deflecting surface 220, or a portion thereof, may extend an angle relative to the mounting surface 192. Additionally or alternatively, the deflecting surface 220, or a portion thereof, may be concave and/or convex, such that the deflecting surface 220, or the portion thereof, extends toward and/or away from the mounting surface 192.

Figure 11:
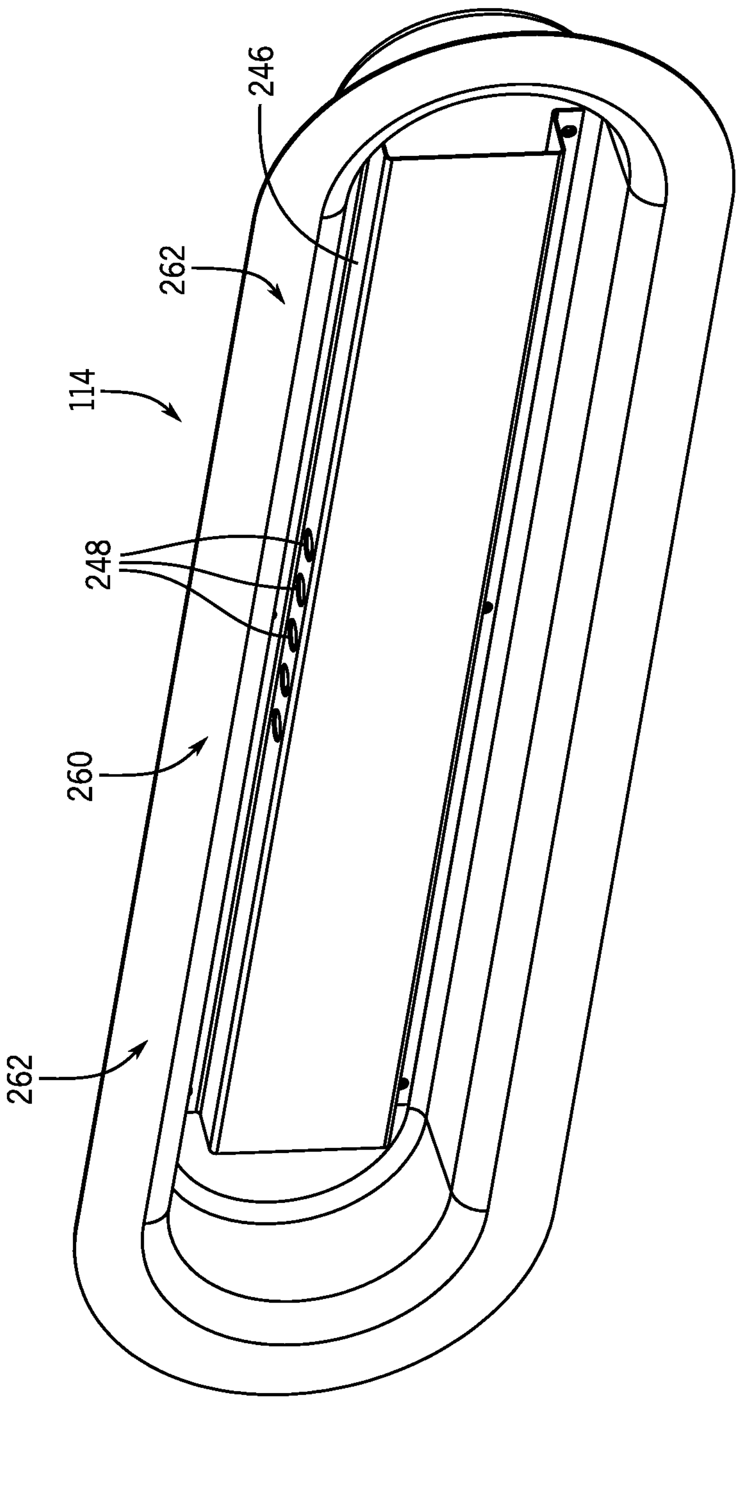
FIG. 11 is a perspective view of an embodiment of a collector box having a diverter plate of an HVAC system, in accordance with an aspect of the present disclosure.

FIG. 11 is a perspective view of another embodiment of the diverter plate 120 of the furnace 100. As illustrated, the diverter plate 120 includes five holes 248 disposed generally at a center portion 260 of the mounting extension 246. In certain embodiments, the mounting extension 246 may include the holes 248 disposed along end portions 262 of the mounting extension 246, such as in addition to or instead of the holes 248 at the center portion 260. Additionally, as illustrated, the side flanges 240 and 242 are omitted from the diverter plate 120. In certain embodiments, the diverter plate 120 of FIG. 11 may include the side flange 240 and/or the side flange 242.

Accordingly, the present disclosure includes a furnace for an HVAC system that is configured to reduce or eliminate formation of condensation. The furnace includes a heat exchanger tube that receives combustion products, via a tube inlet, circulates the combustion products through the heat exchanger tube, and discharges the combustion products via a tube outlet. Additionally, the furnace includes a collector box coupled to the heat exchanger tube at the tube outlet. The collector box has a cavity that receives the combustion products via the tube outlet. Further, the furnace includes a diverter plate coupled to the collector box and disposed within the cavity. The diverter plate intersects a tube flow path/axis of the heat exchanger tube and overlaps the tube outlet to disperse the combustion products received via the tube outlet throughout the collector box. As such, the diverter plate facilitates distribution of heat associated with the combustion products throughout the collector box, thereby reducing condensation of the combustion products along the collector box. Accordingly, the diverter plate described herein may reduce an amount of planned maintenance of the furnace and/or may extend a period of time between planned maintenance. For example, by reducing and/or eliminating condensation of the combustion products within the collector box, the diverter plate may extend a period of time of between planned maintenance of the collector box and/or other portions of the HVAC system.

In certain embodiments, the collector box may be fluidly coupled with varying amounts of heat exchanger tubes, such as five heat exchanger tubes, seven heat exchanger tubes, or nine heat exchanger tubes. The diverter plate may disperse the combustion products received by the collector box, and therefore the heat associated with the combustion products, to portions of the collector box that are offset from the respective tube outlets of the heat exchanger tubes. Additionally, the diverter plate may be utilized with different embodiments of the collector box, including embodiments having different amounts of heat exchanger tubes fluidly coupled to the collector box.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A diverter plate for a furnace of a heating, ventilation, and/or air conditioning (HVAC) system, comprising:

a deflecting surface configured to at least partially overlap a tube outlet of a heat exchanger tube of the furnace, wherein the deflecting surface is configured to disperse combustion products received via the tube outlet throughout a cavity of a collector box of the furnace on a side of the diverter plate opposite the tube outlet; and a flange extending from the deflecting surface, wherein the flange is configured to mount to the collector box, the flange comprises a plurality of holes formed therein, and the plurality of holes is configured to disperse the combustion products on the side of the diverter plate opposite the tube outlet, wherein the deflecting surface is configured to be disposed within the cavity of the collector box.

2. The diverter plate of claim 1, wherein the diverter plate at least partially defines a plurality of openings configured to direct the combustion products therethrough and throughout the collector box.

3. The diverter plate of claim 1, wherein the flange includes a mounting portion configured to mount to the collector box and a mounting extension extending from the deflecting surface to the mounting portion, and wherein the plurality of holes is formed in the mounting extension.

4. The diverter plate of claim 2, wherein the plurality of openings comprises a side passage formed at least partially by the deflecting surface and the flange.

5. The diverter plate of claim 4, comprising a side flange extending from the deflecting surface and into the side passage, wherein the side flange is configured to block at least a portion of the combustion products flowing through the side passage.

6. The diverter plate of claim 1, wherein the deflecting surface is planar.

7. The diverter plate of claim 1, wherein the flange is a first flange, the plurality of holes is a first plurality of holes, the diverter plate comprises a second flange extending from the deflecting surface, the second flange is configured to mount to the collector box, and the second flange comprises a second plurality of holes formed therein and configured to direct the combustion products therethrough and throughout the collector box.

8. The diverter plate of claim 1, wherein the deflecting surface is configured to overlap an entirety of the tube outlet.

9. A diverter plate for a furnace of a heating, ventilation, and/or air conditioning (HVAC) system, comprising:

a deflecting surface configured to overlap a plurality of tube outlets of a plurality of heat exchanger tubes of the furnace, wherein the deflecting surface is configured to disperse combustion products received via the plurality of tube outlets throughout a cavity of a collector box of the furnace on a side of the diverter plate opposite the plurality of tube outlets, and the deflecting surface is configured to be disposed within the cavity of the collector box; and a first flange extending from the deflecting surface in a direction toward the plurality of tube outlets; and a second flange extending from the deflecting surface in the direction toward the plurality of tube outlets, wherein the first flange and the second flange are configured to mount to the collector box, a cover plate coupled to the collector box, or both, wherein the first flange, the second flange, or both comprise a plurality of holes formed therein, and the plurality of holes is configured to disperse the combustion products on the side of the diverter plate opposite the plurality of tube outlets.

10. The diverter plate of claim 9, wherein the diverter plate at least partially defines a plurality of openings configured to direct the combustion products therethrough and throughout the collector box.

11. The diverter plate of claim 10, wherein the plurality of openings comprises a plurality of side passages formed by the deflecting surface, the first flange, and the second flange.

12. The diverter plate of claim 9, wherein the deflecting surface is configured to extend a length beyond an outermost tube outlet of the plurality of tube outlets, and wherein the length is proportional to a diameter of the outermost tube outlet.

13. The diverter plate of claim 9, wherein a first depth of the diverter plate is less than or equal to a second depth of the cavity.

14. A diverter plate for a furnace of a heating, ventilation, and/or air conditioning (HVAC) system, comprising:

a deflecting surface configured to at least partially overlap a tube outlet of a heat exchanger tube of the furnace, wherein the deflecting surface is configured to disperse combustion products received via the tube outlet throughout a collector box of the furnace on a side of the diverter plate opposite the tube outlet;

a first flange extending from the deflecting surface; and a second flange extending from the deflecting surface, wherein the first flange and the second flange are configured to mount to the collector box, a cover plate of the furnace coupled to the collector box, or both, wherein the diverter plate at least partially defines a plurality of openings configured to direct the combustion products therethrough and throughout the collector box, and wherein the deflecting surface is configured to be disposed within the collector box, wherein the first flange, the second flange, or both comprise a plurality of holes formed therein, and the plurality of holes is configured to disperse the combustion products on the side of the diverter plate opposite the tube outlet.

15. The diverter plate of claim 14, wherein the plurality of openings comprises a first side passage and a second side passage formed by the deflecting surface, the first flange, and the second flange.

16. The diverter plate of claim 15, wherein the diverter plate comprises a first side flange extending from the deflecting surface and into the first side passage and a second side flange extending from the deflecting surface and into the second side passage.

17. The diverter plate of claim 14, wherein the deflecting surface is configured to overlap a tube axis of the heat exchanger tube and disperse the combustion products vertically, laterally, or both, relative to the tube axis.

* * * * *